United States Patent [19]
Carter et al.

[11] 3,837,803
[45] Sept. 24, 1974

[54] ORTHOPHOSPHATE CORROSION INHIBITORS AND THEIR USE

[75] Inventors: David A. Carter, Warminster; Chester A. Bishof, North Hills; Frederick G. Vogt, Philadelphia, all of Pa.

[73] Assignee: Betz Laboratories, Inc., Trevose, Pa.

[22] Filed: July 11, 1972

[21] Appl. No.: 270,782

[52] U.S. Cl.................. 21/2.7, 252/87, 252/181, 252/389 A
[51] Int. Cl. ............................................ C23f 11/00
[58] Field of Search ............ 21/2.7; 252/389 A, 87, 252/181; 210/58

[56] References Cited
UNITED STATES PATENTS

| | | |
|---|---|---|
| 3,714,066 | 1/1973 | King et al........................ 252/389 R |
| 3,723,333 | 3/1973 | Freyhold............................ 21/2.7 A |
| 3,738,806 | 6/1973 | Feiler................................. 21/2.7 A |

*Primary Examiner*—Joseph Scovronek
*Assistant Examiner*—Dale Lovercheck
*Attorney, Agent, or Firm*—Alexander D. Ricci; Eugene F. Miller

[57] ABSTRACT

The present disclosure is directed to the inhibition of the corrosion of metallic parts in contact with aqueous systems. This effect is accomplished by the addition to the system of a corrosion inhibiting concentration of a water-soluble organo-phosphonic acid compound having a carbon to phosphorus bond in combination with a water-soluble orthophosphate. The aqueous system should contain solubilized calcium salts and should possess a basic pH. Under certain conditions it is desirable to utilize water-soluble metal cations as a adjunct to the treatment.

28 Claims, No Drawings

ORTHOPHOSPHATE CORROSION INHIBITORS AND THEIR USE

BACKGROUND OF THE INVENTION

The uses of organo-phosphonic acid compounds as corrosion and scale inhibitors in aqueous systems are well-known as evidenced by U.S. Pat. Nos. 3,510,436 and 3,547,817. As corrosion inhibitors for industrial water systems, e.g. cooling water systems, these compounds did not perform quite satisfactorily and required additional components to maintain corrosion under control. The organo-phosphonates described above at what at the time was considered normal operation conditions in, for example cooling water systems (acid pH), although providing acceptable overall protection, did not protect against a localized corrosion commonly referred to as "pitting." As is commonly known, although a particular metallic system immersed in, or conveying an aqueous medium may show an acceptable annual corrosion rate, the corrosion rate may be completely unacceptable because all of the corrosion has taken place at specific and only certain locations. Corrosion of the "pitting" variety will obviously result in weak spots in the metallic structures which, of course, would require the earlier than normal repair or replacement of the respective parts. The electromotive principles of the corrosion of metals in an aqueous system, i.e., anodic and cathodic corrosion, are well-known as established by, for example, the Betz Handbook of Industrial Water Conditioning, 6th Edition, 1962, pp. 258–278.

In addition, the phosphonates were unacceptable alone because they did not provide adequate corrosion protection under heat transfer conditions.

As earlier implied, since the corrosion inhibitors which have been utilized quite successfully in the past cannot be practically and effectively removed from aqueous systems, discharge of water containing these inhibitors is under strict control. The quality of water discharges to natural waters is at present being legislatively regulated and will be under greater scrutiny in the future.

However, the demand for corrosion inhibitors to protect metallic parts in contact with aqueous systems has not diminished, but in fact has been increased due to the emphasis on higher productivity. Downtime, for example, of a cooling water system servicing a large petrochemical processing complex cannot be tolerated since higher efficiency in production means obviously higher revenues to a particular concern.

The water treatment industry then was faced with the burden of furnishing to its customers either new chemicals or compositions which were effective as corrosion inhibitors and which could easily be removed from effluent waters or which could be easily degraded by simple processes, or to recommend the use of the conventional corrosion inhibitors and provide for or recommend effective predischarge treatment systems to remove the unacceptable ingredients.

The present inventors were faced with the alternatives set forth and since they were familiar with the problems associated with the treatment of discharge water, ventured to a project of providing a treatment for the control of corrosion which would make use of certain characteristics of different compounds. The chief objective was to provide a condition in the corrosive aqueous system which would permit the use of chemicals which could be easily degraded and/or which could be readily removed.

For the purpose of the present description, cooling water systems will be utilized as exemplary of an operation which is (i) necessary for air conditioning, or industrial production and closed cooling systems (ii) utilizes a large quantity of water; and (iii) possesses inherent corrosion problems.

The conventional and quite effective treatment of cooling water systems prior to the present invention was to utilize chromate based inhibitors which contained additional ingredients such as phosphates and zinc. Using corrosion inhibitors of this nature, it was necessary to assure that the aqueous systems possessed an acidic pH to maintain solubilized as much of the hardness imparting ions as possible. This avoided to a certain degree scaling problems which would otherwise occur. As is well-known, the formation and deposition of scale-forming salts is pH and temperature-dependent. As the pH increases (i.e., becomes more basic) and as the temperature increases, so does the propensity for scaling problems. Accordingly, the conventional theory of cooling water treatment was (i) to keep aqueous mediums acid to keep the hardness imparting ions, the calcium ions, solubilized to avoid a scaling situation, and (ii) to treat the system with a corrosion inhibitor to control corrosion caused by the acidic pH which was obtained by acid addition. In some treatments, it was also beneficial to utilize scale inhibitors in a threshold treatment to insure against formation and deposition of calcium salts. In other situations an approach was utilized which sought to remove the calcium salts utilizing ion exchange resins. Each modification of course added expense which increased the cost of cooling.

GENERAL DESCRIPTION OF THE INVENTION

The present inventors have in fact taken an approach which is quite different from the conventional treatment and have devised a system for corrosion protection which basically requires scale-forming conditions, i.e., a basic pH and a presence of calcium ions (or similar acting ions). The inventors discovered that if the aqueous system were adjusted to insure a basic pH, i.e., addition of base to acidic aqueous systems or acid to too highly alkaline systems, and that if a minimal calcium ion concentration were insured either by normal constituency or by addition of similar acting ions, that a treatment of a water-soluble organo-phosphonic acid compound having a carbon to phosphorus bond in combination with a water-soluble phosphate compound would provide corrosion protection for the metallic means that was in contact with the aqueous mediums. It was found that a weight ratio of the phosphonic acid compound to orthophosphate compound of from about 0.1:20 to about 40:0.1; more particularly, from about 0.1:10 to about 20:1; and even more specifically from about 1:4 to about 4:1 were used under the conditions prescribed a synergistic activity between the components was obtained which could not have been expected from a consideration of either of the above.

If the aqueous medium contains greater than 4 ppm of calcium ion ("ppm" is utilized throughout this specification in its normal sense to designate parts of the subject material per million parts of the aqueous or water system) and possesses a pH of from about 7.1 to about 9.5, and preferably from about 7.5 to about 8.5, the treatment prescribed above as the invention composition was quite effective.

In the event that the aqueous system does not contain the minimal concentration of the calcium ion or if the aqueous system contains low calcium ion (less than 50 ppm), it may be desirable to utilize as an adjunct to the prescribed treatment a water-soluble salt of a metal cation of the group of zinc, nickel, cobalt, cadmium and chromium. These metal salts are added in such quantity as to provide the system with from about 0.1 to about 25 ppm of the respective metal cation. Normally, when the phosphonic acid compound and the orthophosphate compound are provided as a composition, the metal salts may be included in the composition where necessary in an amount ranging from about 0.2 to about 10 percent by weight of the composition.

Under the above-stated conditions, i.e., the water contains 4 ppm or less of calcium ion, the addition of the water-soluble cation is necessary. However, certain situations may arise which make the use of these water-soluble cations desirable where the water contains greater than 4 ppm but less than 50 ppm of calcium ion.

The conditions which would necessitate the need for a metal cation adjunct to the treatment can be described in the following example.

Consider a cooling water system with a low concentration of calcium in the recirculating water (e.g. 20 ppm) under the optimum conditions of operation of the system. In order to obtain adequate corrosion protection without pitting utilizing this invention, it will be necessary to operate at the more basic pH (pH 8.5 – 9.0) of the range disclosed. This may be undesirable because of potential damage from delignification of the wooden parts of the cooling tower or because the addition of an alkali may be required. Under such conditions, it is desirable to utilize the present invention at a lower pH (pH 7.1–8.5) in conjunction with a water-soluble cation and thereby obtain good corrosion protection without pitting. The quantity of metal cation needed for adequate corrosion protection will depend on the actual pH of operation. At the low end of the pH range (7.1–7.5), more metal cation will be needed than at the higher pH (7.5–8.0 or 8.0–8.5). It is, therefore, possible to design a number of treatment programs at different pH ranges for the same cooling system utilizing this invention.

Although the use of the water-soluble salts of the disclosed cations is quite effective as adjuncts for the inventive treatment, their use may be precluded because of prohibition of discharge of waters containing such to natural waters. In these situations the effluent waters, e.g. bleed-off from cooling water system, must be treated before discharge to remove the unacceptable cations or the treatment must be utilized with variation of pH, etc. to obtain the best possible results without the use of these cations. This can be done and has been done successfully.

In the event that the aqueous system to be treated contains a calcium salt concentration so high as to provide a calcium ion concentration of above 80 ppm, it is desirable to insure that the pH of the aqueous system is between from about 7.1 to about 7.5. The reason being that although in accordance with the process, some calcium precipitation is desirable, a great deal could cause problems. Therefore, if the above technique is utilized, the medium is only slightly alkaline (basic) and permits the corrosion inhibiting composition to operate. The undesirable effects of the precipitation of large quantities of calcium salts are thereby avoided.

The overall treatment range, i.e., the amount of the inhibitor to be added to the system is an amount of from about 2 to 250 ppm and more desirably from about 5 to 100 ppm.

In this regard, however, some explanation is deemed necessary. Some waters contain an orthophosphate dissolved therein as it comes into a plant as influent or is in the plant supply. This phosphate content may have become a constituent in a number of ways, such as being present as a natural constituent, may be present because it was added at another facility and subsequently discharged, or added as a corrosion inhibitor or scale inhibitor by a municipal water supply authority, may be present because of wash-off of phosphate based fertilizers or may be present in the facility's own water supply because of previous additions. With the emphasis on water conservation and water reuse, many facilities have taken to treating their own waste water to remove the easily removables, i.e., sludge, debris, sanitary wastes, etc. and reusing the water in cooling water systems.

In the above instances, the water contains its own orthophosphate content. Accordingly, the amount of phosphate in the water should first be determined and calculated to be trisodium phosphate. When the proper calculation has been made, the composition of the present invention and/or the treatment level for the composition should be modified to reflect the inherent phosphate concentration of the water (aqueous system) to be treated. For example, if a natural water contains orthophosphate and this water is cycled in a cooling tower system, the orthophosphate level may reach a level as high as 10 ppm in the recirculating water. When applying the inventive treatments, the amount of phosphate added will depend upon the amount which is in the makeup water. If, for example, there is 1 ppm of orthophosphate in the make-up water and the system is operating at 4 cycles of concentration, 4 ppm of orthophosphate will consequently be in the recirculating water. If the desire was to control at 6–7 ppm of orthophosphate, the orthophosphate to be added to the system would be that necessary to add 2–3 ppm of orthophosphate ion. In other instances perhaps even less orthophosphate might be added and the corrosion inhibition effectiveness would be obtained so long as the appropriate amount of organo-phosphonic acid compound were added, the pH was basic and the water contains the prerequisite calcium ion concentration.

The orthophosphate compound is essential for the treatment program to operate since it is believed that calcium orthophosphate precipitation like calcium carbonate precipitation occurs at cathodic corrosive sites due to the more basic pH. This precipitator is thereby responsible for the elimination or alleviation of the pitting attack. Iron orthophosphate precipitation on the other hand stifles corrosive attack at other localized parts of the metal surface.

SPECIFICS

The composition of the invention has therefore been described in general terms and accordingly will be described more specifically.

The water-soluble orthophosphate compounds which are operable for the present purposes generally include phosphoric acid, the sodium orthophosphates, the potassium orthophosphates, the lithium orthophosphates and ammonium orthophosphates. The following specific compounds may be mentioned as exemplary.

| | |
|---|---|
| $H_3PO_4$ | phosphoric acid |
| $LiH_2PO_4$ | lithium di acid phosphate |
| $Na_3PO_4$ | trisodium orthophosphate |
| $Na_2HPO_4$ | disodium orthophosphate |
| $NaH_2PO_4$ | monosodium orthophosphate |
| $NaH_5(PO_4)_2$ | hemisodium orthophosphate |
| $K_3PO_4$ | tripotassium orthophosphate |
| $K_2HPO_4$ | dipotassium orthophosphate |
| $KH_2PO_4$ | monopotassium orthophosphate |
| $(NH_4)_3PO_4$ | triammonium orthophosphate |
| $(NH_4)_2HPO_4$ | diammonium orthophosphate |
| $(NH_4)H_2PO_4$ | monoammonium orthophosphate |

In addition to the inorganic orthophosphates set forth above may be mentioned the organic orthophosphates which are set forth in U.S. Pat. No. 3,510,436. The specific compounds are those which possess the basic formula

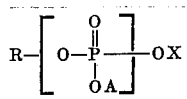

where R is an organic radical as described in the patent, X is A or R, and A is H, Na, Li, K or $NH_4$. Compounds of the above nature are an excellent source of orthophosphate.

The secondary necessary ingredient of the inventive composition is that described as an organo-phosphonic acid compound having a carbon to phosphorus bond, i.e.,

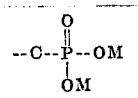

Compounds within the scope of the above description generally are included in one of perhaps three categories which are respectively expressed by the following general formula (1)

where R is a lower alkyl having from about one to six carbon atoms, e.g. methyl, ethyl, butyl, propyl, isopropyl, pentyl, isopentyl and hexyl; substituted lower alkyl of from one to six carbon atoms, e.g. hydroxyl and amino-substituted alkyls; a mononuclear aromatic (aryl) radical, e.g. phenyl, benezene, etc., or a substituted mononuclear aromatic compound e.g. hydroxyl, amino, lower alkyl substituted aromatic, e.g. benzyl phosphonic acid; and M is a water-soluble cation, e.g. sodium, potassium, ammonium, lithium, etc. or hydrogen.

Specific examples of compounds which are encompassed by this formula include:

methylphosphonic acid

ethylphosphonic acid

2-hydroxyethylphosphonic acid

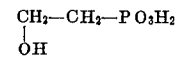

2-amino-ethylphosphonic acid

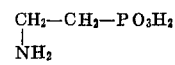

isopropylphosphonic acid

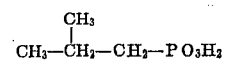

benzene phosphonic acid

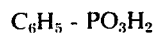

benzylphosphonic acid

(2)
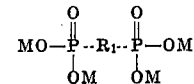

where $R_1$ is an alkylene having from about one to about 12 carbon atoms or a substituted alkylene having from about one to about 12 carbon atoms, e.g. hydroxyl, amino, etc. substituted alkylenes, and M is as earlier defined for (1) above.

Specific exemplary compounds and their respective formulas which are encompassed by the above formula are as follows:

methylene diphosphonic acid

ethylidene diphosphonic acid

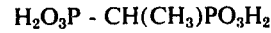

isopropylidene diphosphonic acid

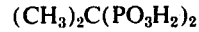

1-hydroxy, ethylidene diphosphonic acid

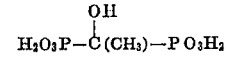

hexamethylene diphosphonic acid

trimethylene diphosphonic acid

decamethylene diphosphonic acid

1-hydroxy, propylidene diphosphonic acid $H_2O_3P\ C(OH)CH_2(CH_3)PO_3H_2$ 1,6-dihydroxy, 1,6-dimethyl, hexamethylene diphosphonic acid $H_2O_3P\ C(CH_3)(OH)(CH_2)\ C(CH_3)(OH)PO_3H_2$ dihydroxy, diethyl ethylene diphosphonic acid $H_2O_3P\ C(OH)(C_2H_5)\ C(OH)(C_2H_5)PO_3H_2$ (3) 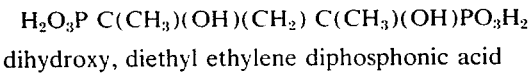

where $R_2$ is a lower alkylene having from about one to about four carbon atoms, or an amine or hydroxy substituted lower alkylene; $R_3$ is [$R_2$ - $PO_3M_2$], H, OH, amino, substituted amino, an alkyl having from one to six carbon atoms, a substituted alkyl of from one to six carbon atoms (e.g. OH, $NH_2$ substituted), a mononuclear aromatic radical and a substituted mononuclear aromatic radical (e.g. OH, $NH_2$ substituted); $R_4$ is $R_3$ or the group represented by the formula

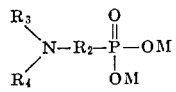

where $R_5$ and $R_6$ are each hydrogen, lower alkyl of from about one to about six carbon atoms, a substituted lower alkyl (e.g. OH, $NH_2$ substituted), hydrogen, hydroxyl, amino group, substituted amino group, a mononuclear aromatic radical, and a substituted mononuclear aromatic nuclear (e.g. OH and amine substituted); R is $R_5$, $R_6$, or the group $R_2$ - $PO_3M_2(R_2$ is as defined above); $n$ is a number of from 1 through about 15; $y$ is a number of from about 1 through about 14; and M is as earlier defined.

Compounds are formulas therefore which can be considered exemplary for the above formulas are as follows:

nitrilo-tri(methylene phosphonic acid)

$N(CH_2PO_3H_2)_3$ imino-di(methylene phosphonic acid)

$NH(CH_2PO_3H_2)_2$ n-butyl-amino-di(methyl phosphonic acid)

$C_4H_9N(CH_2PO_3H_2)_2$ decyl-amino-di(methyl phosphonic acid)

$C_{10}H_{21}N(CH_2PO_3H_2)_2$ trisodium-pentadecyl-amino-di-methyl phosphonate $C_{15}H_{31}N(CH_2PO_3HNa)(CH_2PO_3Na_2)$ n-butyl-amino-di(ethyl phosphonic acid)

$C_4H_9N(CH_2CH_2PO_3H_2)_2$ tetrasodium-n-butyl-amino-di(methyl phosphonate)

$C_4H_9N(CH_2PO_3Na_2)_2$ triammonium tetradecyl-amino-di(methyl phosphonate)

$C_{14}H_{29}N(CH_2PO_3(NH_4)_2)\ CH_2PO_3HNH_4$ phenyl-amino-di(methyl phosphonic acid)

$C_6H_5N(CH_2PO_3H_2)_2$

4hydroxy-phenyl-amino-di(methyl phosphonic acid)

$HOC_6H_4N(CH_2PO_3H_2)_2$ phenyl propyl amino-di(methyl phosphonic acid)

$C_6H_5(CH_2)_3N(CH_2PO_3H_2)_2$ tetrasodium phenyl ethyl amino-di(methyl phosphonic acid)

$C_6H_5(CH_2)_2N(CH_2PO_3Na_2)_2$ ethylene diamine tetra(methyl phosphonic acid)

$(H_2O_3PCH_2)_2N(CH_2)_2N(CH_2PO_3H_2)_2$ trimethylene diamine tetra(methyl phosphonic acid)

$(H_2O_3PCH_2)_2N(CH_2)_3N(CH_2PO_3H_2)_2$ hepta methylene diamine tetra(methyl phosphonic acid)

$(H_2O_3PCH_2)_2N(CH_2)_7N(CH_2PO_3H_2)_2$ decamethylene diamine tetra(metyl phosphonic acid)

$(H_2O_3PCH_2)_2N(CH_2)_{10}N(CH_2PO_3H_2)_2$ tetra decamethylene diamine tetra(methyl phosphonic acid)

$(H_2O_3PCH_2)_2N(CH_2)_{14}N(CH_2PO_3H_2)_2$ ethylene diamine tri(methyl phosphonic acid)

$(H_2O_3PCH_2)_2N(CH_2)_2NH\ CH_2PO_3H_2$ ethylene diamine di(methyl phosphonic acid)

$H_2O_3PCH_2NH(CH_2)_2NH\ CH_2PO_3H_2$ n-hexyl amine di(methyl phosphonic acid)

$C_6H_{13}N(CH_2PO_3H_2)_2$ diethylene triamine penta(methyl phosphonic acid)

$(H_2O_3PCH_2)_2N(CH_2)_2N(CH_2PO_3H_2)(CH_2)_2N(CH_2PO_3H_2)_2$ ethanol amine di(methyl phosphonic acid)

$HO(CH_2)_2N(CH_2PO_3H_2)_2$ n-hexyl-amino(isopropylidene phosphonic acid)methylphosphonic acid $C_6H_{13}N(C(CH_3)_2PO_3H_2)(CH_2PO_3H_2)$ trihydroxy methyl, methyl amino di(methyl phosphonic acid)

$(HOCH_2)_3CN(CH_2PO_3H_2)_2$ triethylene tetra amine hexa(methyl phosphonic acid)

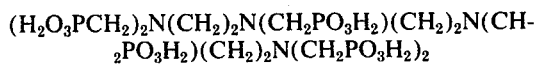

monoethanol, diethylene triamine tri(methyl phosphonic acid)

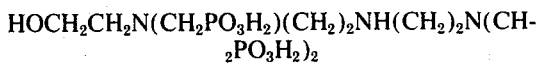

chloroethylene amine di(methyl phosphonic acid)

The above compounds are included for illustration purposes and are not intended to be a complete listing of the compounds which are operable within the confines of the invention.

Metals Salts

The metal salts which may be utilized in accordance with the invention when the calcium ion concentration of a particular aqueous system is below 50 ppm may be any of the respective cation salts which are water soluble. The cloride, bromide, chlorate, nitrate, sulfate, borate salts of each may be utilized for example, or in some cases the cation's organic salts may be utilized, for example acetate, carbonate, buyrate, citrate, caproate, benzoate, etc. salts.

Typical salts for zinc, for example, may be zinc chloride, zinc chlorate, zinc bromide, zinc bromate, zinc borate, zinc nitrate, zinc sulfate, zinc acetate, zinc benzoate, zinc butyrate, zinc carbonate, zinc citrate, zinc caproate, etc. Similar salts for nickel, cobalt, chromium, and cadmium may be utilized so long as the salt is water soluble to an acceptable degree.

In special instances certain waters to be treated will need pH adjustments to insure that the system is in the basic region and more particularly in the 7.1 to 9.5 range. In these cases alkalis such as sodium hydroxide, sodium carbonate, potassium hydroxide, calcium hydroxide, etc. may be utilized. When acid must be added, all of the mineral acids and some organic acids may be utilized. The preferred acid is sulfuric, although nitric and hydrochloric are satisfactory.

In situations where it is known that acid or base addition is necessary for pH control, the acid or base may be included in the composition containing the organophosphonic acid compound and the orthophosphate compound.

SPECIFIC EMBODIMENTS

In order to establish the effectiveness of the combination of the subject phosphonic and orthophosphate compounds, various mixtures of the combinations were prepared by dissolving varying weight ratios of the respective components in water. The ingredients, their respective weight ratios, the treatment range and the results of the testing are set forth in the respective Tables which follow.

In order to illustrate the corrosion inhibiting properties of the features of the present invention, the subject compositions were tested utilizing a spinner testing technique.

In accordance with this technique, dried, precleaned and preweighed coupons of a particular metal are suspended and rotated in a water bath for a period of time. To the water in the bath is added the corrosion inhibiting composition to be tested in a certain proportion by weight. After the coupons (usually six specimens for a realistic study) are circulated in this environment for a predetermined amount of time, they are removed, cleaned, dried and weighed to determine weight loss. This weight loss for the specific period is then utilized to calculate the corrosion rate for a year and is reported as corrosion rate of mils per year (mpy). The details concerning the test parameters of the test are set forth below.

One point should be explained regarding the testing conditions. The corrosion rates set forth in the Tables are relatively high for practical purposes. However, this was purposely provided for by the selection of the constituency of the aqueous testing environment. The aqueous testing medium was produced so as to provide a very corrosive environment. It was felt that if the compositions and treatment techniques of the invention were as effective as claimed, that the enhanced activity would be pronounced and easily discernible. Basically, the theory followed is that if a corrosion inhibitor is to be considered effective under general and conventionally found conditions, it must also exhibit this effectiveness under severe and drastic conditions which are also found in particular situations and particular regions of the country. Accordingly, the severe and drastic conditions were selected for the purpose of the present testing program.

Test Condition 1

| Spinner System: | |
|---|---|
| Calcium ion concentration as $CaCO_3$ | 340 ppm |
| Magnesium ion concentration as $CaCO_3$ | 220 ppm |
| Chloride ion concentration | 240 ppm |
| Sulfate ion concentration | 210 ppm |
| Copper ion concentration | 0.4 ppm |
| pH | 8.0 |
| Temperature | 120F |
| Flow rate | 1.5 ft. per second |
| Duration of test | Three (3) days |
| Aeration | Constant |
| Test specimens | High carbon steel AiSi 1090 |

TABLE 1

Evaluation of Methyl Phosphonic Acid (referred to below as Compound A) ND Trisodium Phosphate Combination (referred to below as Compound B)

Treatment Level: 40 ppm

| Treatment Material | Weight Ratio of Compound A:Compound B | Corrosion Rate (mpy) |
|---|---|---|
| Compound A | — | 27 |
| Compound B | — | 16 |
| Compound A + Compound B | 1:2 | 7 |
| Compound A + Compound B | 1:1 | 11 |
| Compound A + Compound B | 2:1 | 10 |
| Compound A + Compound B | 5:1 | 15 |

TABLE 2

Evaluation of Ethyl Phosphonic Acid (referred to below as Compound C for this Example) and Trisodium Phosphate (referred to below as Compound D)

Treatment Level: 40 ppm

| Treatment Material | Weight Ratio of Compound C:Compound D | Corrosion Rate (mpy) |
|---|---|---|
| Compound C | — | 32 |
| Compound D | — | 16 |
| Compound C + Compound D | 1:2 | 7 |
| Compound C + Compound D | 1:1 | 7.5 |
| Compound C + Compound D | 2:1 | 9.5 |

TABLE 3

Evaluation of Benzene Phosphonic Acid (referred to below as Compound E) and Trisodium Phosphate (referred to below as Compound F)

Treatment Level: 40 ppm

| Treatment Material | Weight Ratio of Compound E:Compound F | Corrosion Rate (mpy) |
|---|---|---|
| Compound E | — | 46 |
| Compound F | — | 16 |
| Compound E + Compound F | 1:2 | 6 |
| Compound E + Compound F | 1:1 | 16 |
| Compound E + Compound F | 2:1 | 5 |
| Compound E + Compound F | 5:1 | 17 |

TABLE 4

Evaluation of Nitrilo-tri(methylene phosphonic acid)(referred to in this Table as Compound G) and Trisodium Phosphate (referred to as Compound H in this Table)

Treatment Level: 20 ppm

| Treatment Material | Weight Ratio of Compound G:Compound H | Corrosion Rate (mpy) |
|---|---|---|
| Compound G | — | 38 |
| Compound H | — | 32 |
| Compound G + Compound H | 1:2 | 23 |
| Compound G + Compound H | 1:1 | 14 |
| Compound G + Compound H | 2:1 | 21 |
| Compound G + Compound H | 5:1 | 28 |

TABLE 5

Compounds G + H of Table 4
Treatment Level: 40 ppm

| Treatment Material | Weight Ratio of Compound G:Compound H | Corrosion Rate (mpy) |
|---|---|---|
| Compound G | — | 8 |
| Compound H | — | 16 |
| Compound G + Compound H | 1:2 | 6 |
| Compound G + Compound H | 1:1 | 1 |
| Compound G + Compound H | 2:1 | 4 |
| Compound G + Compound H | 5:1 | 5 |

TABLE 6

Evaluation of 1-hydroxy-ethylidene 1,1-diphosphonic acid (referred to as Compound J in this Table) and Trisodium Phosphate (referred to as Compound K in this Table)

Treatment Level: 20 ppm

| Treatment Material | Weight Ratio of Compound J:Compound K | Corrosion Rate (mpy) |
|---|---|---|
| Compound J | — | 18 |
| Compound K | — | 32 |
| Compound J + Compound K | 1:2 | 3 |
| Compound J + Compound K | 1:1 | 6 |
| Compound J + Compound K | 2:1 | 6 |
| Compound J + Compound K | 5:1 | 15 |

TABLE 7

Evaluation of Dodecylamino-dimethyl phosphonic acid (referred to as Compound L in this Table) and Trisodium Phosphate (referred to as Compound M)

Treatment Level: 40 ppm

| Treatment Material | Weight Ratio of Compound L:Compound M | Corrosion Rate (mpy) |
| --- | --- | --- |
| Compound L | — | 112 |
| Compound M | — | 16 |
| Compound L + Compound M | 1:2 | 25 |
| Compound L + Compound M | 1:1 | 7 |
| Compound L + Compound M | 2:1 | 11 |

TABLE 8

Evaluation of Hexapotassium, dihydrogen, 1-dimethylene diamine tetra(methylene phosphonate) (referred to below as Compound N) and Trisodium Phosphate (referred to below as Compound O)

Treatment Level: 40 ppm

| Treatment Material | Weight Ratio of Compound N:Compound O | Corrosion Rate (mpy) |
| --- | --- | --- |
| Compound N | — | 10 |
| Compound O | — | 16 |
| Compound N + Compound O | 1:2 | 7 |
| Compound N + Compound O | 1:1 | 8 |
| Compound N + Compound O | 2:1 | 6 |

TABLE 9

Evaluation of Hexapotassium, dihydrogen hexamethylene diamine tetra(methylene phosphonate)(referred to as Compound P in the Table below) and Trisodium Phosphate (referred to as Compound Q)

Treatment Level: 40 ppm

| Treatment Material | Weight Ratio of Compound P:Compound Q | Corrosion Rate (mpy) |
| --- | --- | --- |
| Compound P | — | 12 |
| Compound Q | — | 16 |
| Compound P + Compound Q | 1:2 | 7 |
| Compound P + Compound Q | 1:1 | 8 |
| Compound P + Compound Q | 2:1 | 6 |

The above data clearly demonstrate that the two types of compounds cooperate quite effectively to produce enhanced corrosion protection. In certain cases above the corrosion rate of the combination is quite close to that for the trisodium phosphate alone. However, even in these instances, the combinations offer a distinct advantage since the primary ingredient is the ingredient which is biodegradable and which accordingly is not particularly difficult to treat for subsequent discharge of waters containing such. In addition, the use of trisodium phosphate or orthophosphate alone is to be avoided because under the parameters of the present treatment technique orthophosphate will precipitate as calcium phosphate over the entire metallic surface and seriously reduce heat transfer efficiency.

The invention has been evaluated in the field in industrial cooling water systems and found to be generally effective for the purpose.

One example which represents a typical application of the invention is a situation encountered in the cooling system of a steel mill. The recirculating cooling water contained 112 ppm of Total Hardness as $CaCO_3$ (80 ppm Ca as $CaCO_3$ and 32 ppm Mg as $CaCO_3$). The Methyl Orange alkalinity was 24 ppm as $CaCO_3$, 62 ppm sulfate and 66 ppm chloride. The pH of the system was adjusted to produce a pH of 7.1–7.5. In addition, the water contained an orthophosphate content calculated as from about 5 to about 9 ppm as $Na_3PO_4$. Sufficient nitrilotri(methylenephosphonic acid) was added to the cooling water system in an amount (5–10 ppm) to approximate a 1:1 weight ratio of the phosphonic acid compound to the trisodium phosphate. Corrosion data on low carbon steel was established to be quite good over a 4-month period, i.e., 1.8 mils per year (mpy) in the Hot Well where proper controls were maintained throughout the test period.

Other examples of the effectiveness of the present treatment were demonstrated by two cooling water systems, the water from which contained from about 3.3 to 9 ppm of $Na_3PO_4$. The pH of the system was adjusted so as to obtain a pH of from 7.1 to 7.5. A combination of phosphonates were added, i.e., 4 ppm nitrilotri(methylenephosphonic acid) and 5 ppm 1-hydroxy, ethylidene phosphonate, so as to provide a ratio of the phosponates to the trisodium phosphate of 9:7. The treatment has been on-stream for a few months and the corrosion rates, with only fair control of operating conditions, i.e., maintaining proper concentration of ingredients, maintaining control of cycles of concentration, maintaining control of pH, were in the area of 4 to 6.5 mpy. This is felt to be quite good in view of the fact that only fair control was maintained.

When the parameters of the invention are observed, the inventive concept provides impressive corrosion inhibition in aqueous systems. In addition the treatment compositions do not contain highly toxic or highly detrimental constituents.

The invention has been field evaluated in other industrial cooling systems. When the pH and calcium ion content parameters of the invention were maintained in the circulating water, the inventive compositions were found to be quite effective. In some instances the inventive compositions were used alone while in other cases where copper corrosion, e.g. in the fittings, was a problem, well-known copper corrosion inhibitors such as benzotriazole, mercaptobenzothiozole, mercaptobenzothiol, etc. were included with success in the composition and in the treatment itself.

An impressive feature of the invention which was discovered during field trails was that where the combination of the phosphonic acid compound and the orthophosphate compound were used at the basic pH in a system previously treated for sometime with a chromate-based treatment; the treatment was exceptionally effective since the system was apparently well-passivated prior to treatment in accordance with the present invention.

Having thus described the invention, what we claim is:

1. A method for controlling the corrosion of metal parts in contact with an aqueous system containing solubilized calcium salts which comprises insuring that the pH of said system is from about 7.1 to about 9.5 and adding to said system an amount of,
   i. a single water-soluble organo-phosphonic acid compound having a carbon to phosphorus bond, or water-soluble salt thereof, and
   ii. a water-soluble orthophosphate compound; said organo-phosphonic acid compound and said orthophosphate compound being added in such quantities as to provide in said aqueous system a weight ratio of said phosphonic acid compound to said phosphate compound of from about 0.1:20 to about 40:0.1.

2. A method according to claim 1 wherein the solubilized calcium salts are present in a concentration to provide 50 parts or less of calcium ion per million parts of said aqueous system and a water-soluble salt of a metal selected from the group consisting of zinc, nickel, cobalt, chromium, and cadmium is added to said system in an amount to provide from about 0.1 to about 50 parts of said metal ion per million parts of said aqueous system.

3. A method according to claim 1 wherein the solubilized calcium salt concentration is present in an amount sufficient to provide a calcium ion concentration of above 80 parts per million parts of said system and said pH is adjusted so as to insure a pH of from about 7.1 to about 7.5.

4. A method according to claim 1 wherein the aqueous system before addition of said phosphate compound contains dissolved orthophosphate compound and the amounts of said compounds (i) and (ii) added are adjusted so as to reflect the concentration of the dissolved phosphate compound to insure that the weight ratio of (i) to (ii) is within the specified range.

5. A method according to claim 1 wherein said phosphonic acid compound has a formula selected from the group of:

(1) 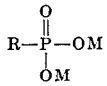

where R is a lower alkyl having from one through six carbon atoms, a substituted lower alkyl, a mononuclear aromatic radical, or a substituted mononuclear aromatic radical, and M is a hydrogen or a water-soluble cation;

(2) 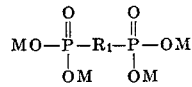

where $R_1$ is an alkylene having from about one to about 12 carbon atoms, or a substituted lower alkylene, and M is as above defined:

(3) 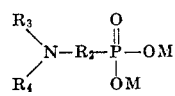

where $R_2$ is a lower alkylene having from one to about four carbon atoms, or a substituted lower alkylene, $R_3$ is $-R_2-PO_3M_2$, H, OH, amino, a substituted amino, an alkyl having from one to six carbon atoms, a substituted alkyl, or a mononuclear aromatic, a substituted mononuclear aromatic, $R_4$ is $R_3$ or

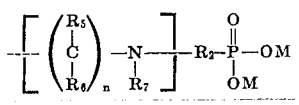

where $R_5$ and $R_6$ are each lower alkyl having from one to six carbon atoms, a substituted lower alkyl, H, OH, amino, a substituted amino, a mononuclear aromatic, a substituted mononuclear aromatic; $R_7$ is $R_5$, $R_6$ or $-R_2-PO_3M_2$; $n$ is a number of from 1 through about 15; $y$ is a number of from 1 through about 14; and M is as above defined.

6. A method according to claim 5 wherein the pH of the aqueous system is from about 7.1 to about 9.5 and contains at least 4 parts of calcium ion per million parts of aqueous system.

7. A method according to claim 5 wherein the solubilized calcium salts are not present in a concentration to provide 50 ppm or less of calcium ion per million parts of said aqueous system and a water-soluble salt of a metal selected from the group consisting of zinc, nickel, cobalt, chromium, and cadmium is added to said system in an amount to provide from about 0.1 to about 50 parts of said metal ion per million parts of said aqueous system.

8. A method according to claim 5 wherein the solubilized calcium salt concentration is present in an amount sufficient to provide a calcium ion concentration of about 80 parts per million parts of said system and said pH is adjusted so as to insure that the pH is from about 7.1 to about 7.5.

9. A method according to claim 5 wherein the aqueous system before addition of said phosphate compounds contains dissolved orthophosphate compound and the amounts of said compounds (i) and (ii) added are adjusted so as to reflect the concentration of the dissolved phosphate compound to insure that the weight ratio of (i) to (ii) is within the specified range.

10. A method according to claim 5 wherein the pH of the aqueous system is from about 7.5 to about 8.5 and the ratio of phosphonic acid compound to phosphate compound is from about 1:10 to about 20:1.

11. A method according to claim 10 wherein said phosphonic acid compound is that as represented by (1).

12. A method according to claim 11 wherein said compound is selected from the group consisting of methylphosphonic acid, ethylphosphonic acid, benzene phosphonic acid and the water-soluble salts thereof.

13. A method according to claim 10 wherein said phosphonic acid compound is that represented by (2).

14. A method according to claim 13 wherein the compound is 1-hydroxyethylidene 1,1-diphosphonic acid or the water-soluble metal salts thereof.

15. A method according to claim 11 wherein said phosphonic acid compound is that as represented by formula (3).

16. A method according to claim 15 wherein the compound is selected from the group consisting of nitrilotri(methylene phosphonic acid), dodecylaminodimethylenephosphonic acid, ethylene diamine tetra(methylphosphonic acid), hexamethylene diamine tetra(methylphosphonic acid) and the water-soluble salts thereof.

17. A method according to claim 1 wherein the pH of said system is from about 7.5 to 8.5, said system contains at least 4 parts of calcium ion per million parts of said aqueous system and said phosponate and phosphate are added as a mixture in an amount of from about 2 to about 250 parts per million parts of said aqueous system and said orthophosphate compound is selected from the group consisting of phosphoric acid, sodium orthophosphates, potassium orthophosphates, lithium orthophosphates and ammonium orthophosphates.

18. A method according to claim 5 wherein the pH of said system is from about 7.5 to 8.5, said system contains at least 4 parts of calcium ion per million parts of said aqueous system and said phosphonate and phosphate are added as a mixture in an amount of from about 2 to about 250 parts per million parts of said aqueous system and said orthophosphate compound is selected from the group consisting of phosphoric acid, sodium orthophosphates, potassium orthophosphates, lithium orthophosphates and ammonium orthophosphates.

19. A method according to claim 17 wherein the aqueous system is a cooling water system.

20. A method according to claim 18 wherein the aqueous system is a cooling water system.

21. A composition for controlling the corrosion of metallic parts in contact with an aqueous media comprising,
   (i) a single water-soluble organo-phosphonic acid compound having a carbon to phosphorus bond, or water-soluble salt thereof, and
   (ii) a water-soluble orthophosphate compound; said compounds being present in the composition to provide a weight ratio of said phosphonic acid compound to said phosphate of from about 1:4 to about 4:1.

22. A composition according to claim 21 which contains from about 0.2 to about 10 percent weight of a water-soluble salt of a metal selected from the group consisting of zinc, nickel, cobalt, chromium and cadmium.

23. A composition according to claim 22 wherein the metal is zinc.

24. A composition according to claim 21 wherein the phosphonic acid compound has a formula selected from the group consisting of:

(1) 

where R is a lower alkyl having from one through six carbon atoms, a substituted lower alkyl, a mononuclear aromatic radical, or a substituted mononuclear aromatic radical, and M is a water-soluble cation;

(2) 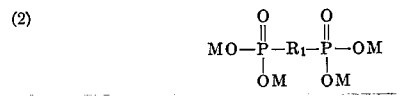

where $R_1$ is a lower alkylene having from one through six carbon atoms or a substituted lower alkylene, and M is as above defined;

(3) 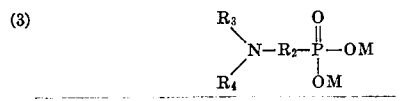

where $R_2$ is a lower alkylene having from one to four carbon atoms, or a substituted lower alkylene;
$R_3$ is $R_2$ -$PO_3M_2$, H, OH, amino, a substituted amino, an alkyl having from one to 15 carbon atoms, a substituted alkyl, or a mononuclear aromatic, a substituted mononuclear aromatic; $R_4$ is $R_3$ or

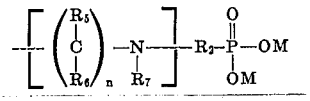

where $R_5$, $R_6$ are each lower alkyl having from one to six carbon atoms, a substituted lower alkyl, H, OH, amino, a substituted amino, a mononuclear aromatic, a substituted mononuclear aromatic; $R_7$ is $R_5$, $R_6$ or -$R_2$-$PO_3M_2$; n is a number of from about 1 through about 14; and M is as above defined; and said phosphonate to phosphate ratio is from about 1:10 to about 20:1.

25. A composition according to claim 24 wherein said orthophosphate is selected from the group consisting of phosphoric acid, sodium orthophosphates, potassium orthophosphates, lithium orthophosphates and ammonium orthophosphates.

26. A composition according to claim 25 wherein said phosphonic acid compound is selected from the group consisting of methylphosphonic acid, ethyl phosphonic acid, benzene phosphonic acid, 1-hydroxyethylidene-1,1-diphosphonic acid, nitrilotri (methylenephosphonic acid), dodecylamino-dimethylenephosphonic acid, ethylene diamine tetra(methylphosphonic acid) and the water-soluble salts thereof.

27. A composition according to claim 26 which contains from about 0.2 to about 10 percent weight of a water-soluble salt of a metal selected from the group consisting of zinc, nickel, cobalt, cerium, chromium manganese, cadmium, lead and tin.

28. A composition according to claim 27 where the metal is zinc.

* * * * *